United States Patent
Gordon et al.

(10) Patent No.: US 8,060,443 B2
(45) Date of Patent: Nov. 15, 2011

(54) ELECTRONIC COPYRIGHT LICENSE REPOSITORY

(75) Inventors: Michael M. Gordon, Paradise Valley, AZ (US); Nathan F. Raciborski, Phoenix, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 1101 days.

(21) Appl. No.: 11/375,931

(22) Filed: Mar. 15, 2006

(65) Prior Publication Data

US 2006/0212405 A1     Sep. 21, 2006

Related U.S. Application Data

(60) Provisional application No. 60/662,807, filed on Mar. 15, 2005.

(51) Int. Cl.
    *G06F 17/60*          (2006.01)
    *G06F 15/16*          (2006.01)

(52) U.S. Cl. .................................. 705/51; 709/219

(58) Field of Classification Search .............. 705/50, 705/51, 52, 59
See application file for complete search history.

(56) References Cited

U.S. PATENT DOCUMENTS

| | | | | |
|---|---|---|---|---|
| 6,934,693 | B2 * | 8/2005 | Stefik et al. | 705/51 |
| 7,028,009 | B2 * | 4/2006 | Wang et al. | 705/51 |
| 7,076,652 | B2 * | 7/2006 | Ginter et al. | 713/153 |
| 7,080,041 | B2 * | 7/2006 | Nagel | 705/51 |
| 7,206,765 | B2 * | 4/2007 | Gilliam et al. | 705/51 |
| 7,222,104 | B2 * | 5/2007 | Tadayon et al. | 705/54 |
| 7,260,556 | B2 * | 8/2007 | Stefik | 705/52 |
| 2005/0005166 | A1 * | 1/2005 | Kouznetsov et al. | 713/201 |
| 2005/0177624 | A1 * | 8/2005 | Oswald et al. | 709/219 |

\* cited by examiner

*Primary Examiner* — Evens J Augustin
(74) *Attorney, Agent, or Firm* — Kilpatrick Townsend & Stockton LLP

(57) ABSTRACT

A content distribution system for transporting audio or video licenses between content players that use digital rights management (DRM) is disclosed. The content distribution system includes at least a second license repository and an authentication engine. The second license repository receives second information describing a second plurality of content licenses. A first license repository stores a first plurality of content licenses. The first plurality of content licenses enable use of a plurality of content objects with a first content player within confines of DRM. The second license repository is geographically distant from the first license repository. The authentication engine authorizes the second plurality of content licenses of the second license repository. The second plurality of content licenses enable use of the plurality of content objects with the second content player within the confines of DRM.

27 Claims, 10 Drawing Sheets

ELECTRONIC COPYRIGHT LICENSE REPOSITORY

This application claims the benefit of and is a non-provisional of U.S. Provisional Application Ser. No. 60/662,807 filed on Mar. 15, 2005, which is hereby expressly incorporated by reference in its entirety for all purposes.

BACKGROUND

This disclosure relates in general to audio and video licensing and, but not by way of limitation, to moving of licensed audio and video to new computing devices.

Today there are software players that play audio and video downloaded from the Internet or obtained through other sources. The availability of digital rights management (DRM) has made copyright holders more comfortable with this new paradigm of licensing their audio and video in downloadable form. Different software players use different and incompatible DRM that slows adoption by consumers.

A consumer who downloads a song from one download service has to play the song on the corresponding proprietary player. A DRM used by the corresponding proprietary player ties a consumer to that player. Another player is unlikely to play the song as the DRM prevents this use inadvertently because it is incompatible with the DRM used by the new player. For example, a consumer may download a song from the Apple™ music store for their iTunes™ player. Later, should the consumer decide to start using the Rhapsody™ Jukebox, the song would not play. The consumer may have to purchase the song again even though there are arguably rights to use the song with any player.

There are programs that disable or strip the DRM from a song such that it can be used with most player. Some take the position that this type of software is illegal and violates the Digital Millennium Copyright Act (DMCA) in the United States or some other law. Additionally, there are programs that will transcode one codec into another. These programs take a song that might be in a proprietary format and convert it to a format that can be used in a new player. Between the DRM stripping software and the transcoding software, consumers can move their music collection to a new player. This process is complex and, some might say, illegal.

SUMMARY

In one embodiment, the present disclosure provides a content distribution system for transporting audio or video licenses between content players that use digital rights management (DRM). The content distribution system includes at least a second license repository and an authentication engine. The second license repository receives second information describing a second plurality of content licenses. A first license repository stores a first plurality of content licenses. The first plurality of content licenses enable use of a plurality of content objects with a first content player within confines of DRM. The second license repository is geographically distant from the first license repository. The authentication engine authorizes the second plurality of content licenses of the second license repository. The second plurality of content licenses enable use of the plurality of content objects with the second content player within the confines of DRM.

In another embodiment, the present disclosure provides a method for transporting content licenses from a first content player to a second content player. In one step, a plurality of content licenses is read from a first repository of the first content player. The plurality of content licenses enable use of a plurality of content objects within confines of DRM. The plurality of content licenses are associated with a plurality of licensors. The plurality of content licenses is sent to a store, which is geographically remote to the first repository. Authentication information of a licensee of the plurality content licenses is sent. The plurality of content licenses is written to a second repository of the second content player. The second content player can use the plurality of content objects within the confines of DRM.

In yet another embodiment, the present disclosure provides a method for transporting audio or video licenses between content players. In one step, first information is received that describes a first plurality of content licenses at a point. A first repository stores the first plurality of content licenses. The first plurality of content licenses enable use of a plurality of content objects on a first content player as allowed by DRM. The point is geographically remote to the first repository. A licensee of the first plurality content licenses is authenticated. Second information is sent that enables a second plurality of content licenses corresponding to the first plurality of content licenses away from the point. The second plurality of content licenses is stored with a second repository of the second content player. The second plurality of content licenses allows use of the plurality of content objects on the second content player as allowed by DRM.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

There are many content download services available. Users download content (e.g., songs, software, videos, sound, books) to a computing device (e.g., personal computer, mobile phone, music player, personal video recorder, set top box, portable video player) for their enjoyment. To control access to these files, various forms of digital rights management (DRM) are used. The player hardware, software-based players, storage devices, and delivery channels may all have DRM to control access and enforce copyright licenses. For example, Microsoft™ Windows has DRM that controls access to music and video files.

Different applications and hardware control DRM in different manners, but generally store a list of copyright licenses for a particular file or stream. An identifier code is either embedded in the content object or associated with the content object in some way. The DRM application program interface (API) is provided with the content object itself or the identifier code in determining if a copyright license is available. Generally, where there is no copyright license, the DRM prevents or restricts use of the content object. Even though the content file is available, the DRM prevents playback.

Figure 1A:
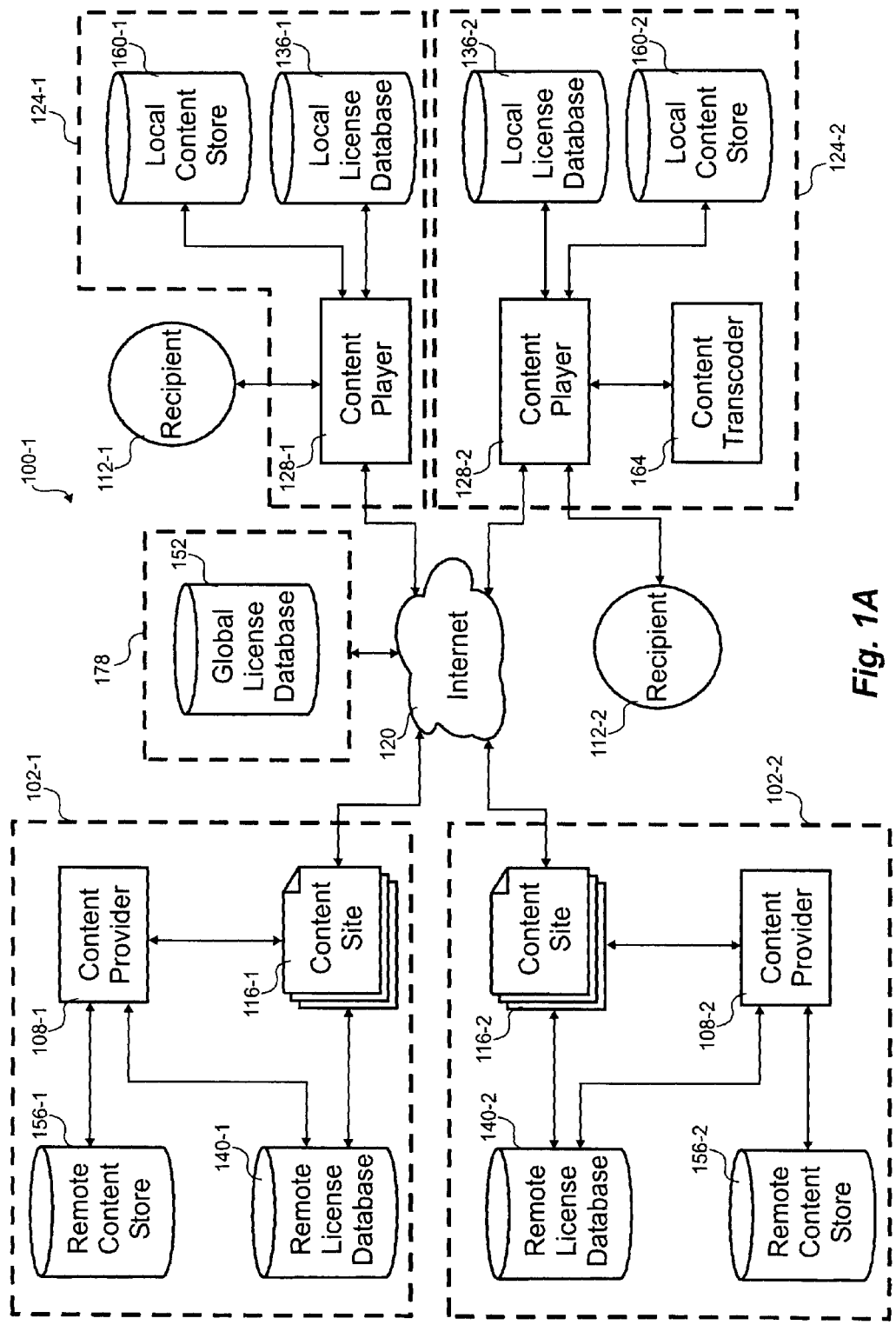
FIGS. 1A through 1G depict block diagrams of embodiments of a content distribution system.

Referring initially to FIG. 1A, an embodiment of a content distribution system 100-1 is shown. This embodiment shows two content providers 108 and two users 112, but it is to be understood that there may be any number of content providers 108 and users 112 in various embodiments. The user 112 could be the same person working with two computing devices 124 in an upgrade process. For example, the user may have music or video on the first computing device 124-1 and wish to move the music or video to the second computing device 124-2 for use. A migration system 178 can have various configurations to aid the move to the second computing device 124-2.

This embodiment shows two content originators 102, but there could be any number content originators. Content originators 102 may be content subscription and/or download services that have content they own or have the right to license stored in a remote content store 156. A content provider 108 gives access to the content objects through a content web site or application interface 116. Licenses granted to the content objects are stored in the remote license database 140. The remote license database 140 can be used to provide content licenses to the new computing device 124 in a migration situation. A migration system may pass the content licenses to the new content player 128, but could verify their validity at the various remote license databases 140 for the content objects of the user 112.

In this embodiment, the computing device 124 includes a content player 128, a local content store 160, a local license database 136, and optionally, a content transcoder 164. In various embodiments, the local content store 160 and local license database 136 could be coupled to the content player 128 using an integral and/or internal storage medium, an external storage medium and/or a networked storage medium. A user 112 interacts with the computing devices 124 to play or realize the content objects resident in a local content store 160 and/or streamed from a remote content object store 156.

Users 112 often upgrade their software and/or hardware for various reasons. During this process, copyright licenses can be lost due to compatibility and integration problems in conventional systems. FIG. 1A is simplified in that it shows only one local license database 136 for each computing device 124, but often each DRM technique and/or player maintains its own local license database 136 such that the computing device 124 may have many local license databases 136.

Local license databases 160 in computing devices 124 are often not compatible with each other, even though the content object could be used with different content players. For example, Apple™ iTunes™ uses a DRM incompatible with that used by Microsoft™ Windows Media Player™ such that content licenses cannot be exchanged between the two even though the players could play each-others content with the proper codec support.

This embodiment uses a content transcoder 164 and at least one remotely-located license databases 152, 140 to migrate the content objects and content licenses to a new computing device 124. A secured content object (i.e., a content file or stream protected by DRM) may be used on another computing device 124, but the copyright license would not follow the user 112 to the other computing device 124 in conventional systems. For example, a first music player may recognize a content file and allow playing because the DRM recognizes a copyright license, but a second music player may recognize the content file without being able to recognize a copyright license such that access is prevented.

One embodiment of the invention allows transport of a local license database 136 between various computing devices 124 that a user 112 might use. A software application, software applet or the content player itself can pass all or some of the local license database 136 to a global license database 152 or a remote license database 140. Passing of the local license database 136 is done opaquely in some embodiments using encryption to protect the information. The copyright licenses on the old computing device 124 are no longer usable once passed to the global license database 152 or a remote license database 140. The user can authenticate their right to copyright licenses with the new computing device 124 and have the new local license database 136 populated by opaquely passing the copyright licenses to the local license database 136 of the new computing device 124.

The migration system 178 may have to communicate with the various content originators 102 associated with each content object. Further, the content licenses may be translated to a format for the DRM of the new computing device 124. In some cases, the contents of the local license database 136 are not transferred, but an abbreviated listing of the licenses could be transferred. The content originator 102 may track the content licenses of each user and the migration system 178 could update the content originators 102 as the migration takes place.

The content player 128 or another application passes the licenses in opaque form to the global license database 152, which acts as an intermediary between the old local license database 136-1 and a new local license database 136-2. The licenses may or may not be opaque to the global license database 152. Where the license information is kept opaque, only the content player 128-2 of the new computing device 124-2 understands how to decode and reactivate the licenses. Public or private keying can be used in various embodiments encrypt the content licenses during transport.

Content transported to the new computing device 124-2 can then be played after any re-formatting by a content transcoder 164. In this embodiment, the content transcoder is in the new computing device 124-2, but in other embodiments could be in the old computing device 124-1, the content originator 102, the migration system 178, or elsewhere. After sending the content licenses, content objects on the old computing device 124-1 cannot pass the DRM checks to allow playback on the old computing device 124-1. The content objects on the old computing device 124-1 could be deleted to further prevent unauthorized use. Some embodiments may allow paying a fee to allow both the old and new computing devices 124 to retain licenses to play the content objects. Such an arrangement can be offered by the content originators 102.

Where the global license database 152 is not opaque to the licenses, the global license database 152 can serve as a clearinghouse for the various computing devices 124. An application on the computing device 124 could opaquely send the local license database to the global license database 152 where the licenses are converted to plaintext. A different content player 128 using a different license format could request the content licenses from the global license database 152 after proper authentication of the licensee. The content licenses would be converted to the native format of the different content player 128 and sent opaquely to the different content player 128. In this way, content licenses could be exchanged between incompatible content players 128. Some embodiments may confirm the licenses before movement by checking with the content originator 102 who originally granted the license to the user 112.

In some cases, the new computing device 124 and/or content player 128 may not understand the old format of the content object. A conversion application or content transcoder 164 could transcode the content object to allow it to be compatible with the new computing device 124 and/or content player 128. The conversion application could be located anywhere in the content distribution system 100, for example, at the content provider 108, the global license database 152 or the computing device 124 (as in this embodiment).

Some embodiments could download the content object from the content provider 108 in the new format after destruction of the old content object and verification that the license is valid. There may or may not be an additional charge for the download in the new format. A replacement content license could be included along with the content object in the new format.

In one embodiment, the computing device 124-1 does not actually transport the licenses to the new computing device 124-2, but destroys the licenses in the local license database 136-1 and merely reports the destruction to the remote or global license database 140, 152. Once destroyed, a new computing device 124-2 can receive the content licenses in any format compatible with the computing device 124-2 and/or content player 128-2. The contents of the local content database 136-1 may already be known to the remote or global license database 140, 152 such that only destruction need be communicated and those content licenses become available for the new content player 128-2.

One embodiment uses a removable storage media (e.g., magnetic disk, optical disk, flash media, hard drive, optically readable media) to transport the content licenses to the new local license database 136. The removable storage media can be loaded with the content licenses in an opaque form. The new computing device 124 could load the content licenses and destroy the ability to load the content licenses on another computing device 124. For example, the content licenses could be erased. Another embodiment could require authentication from a remote trusted party before reading the content licenses into the new local license database 136-2. The remote trusted party would only allow reading the content licenses on one or a set number of computing devices 124 as allowed by the license. The content objects could also be transported with the removable storage media.

Authentication of the licensee before loading the content licenses on the new computing device 124 can be explicit or implicit. Where the license is to a person or group of persons, a password or biometric authentication technique can be used. For implicit authentication, the content licenses are not tied to a particular user but tied to possession of a code or the removable storage media. For example, whoever enters a pass code or possesses the removable storage media with the content licenses can load them onto the new computing device 124. An authenticating party can enforce the number of simultaneous users of the content licenses, such that if another tries to use the content licenses beyond their terms, access could be denied. For example, if someone steals the removable storage media, that person could use the content licenses unless they have already been loaded on the specified number of computing devices 124 already.

Figure 1B:
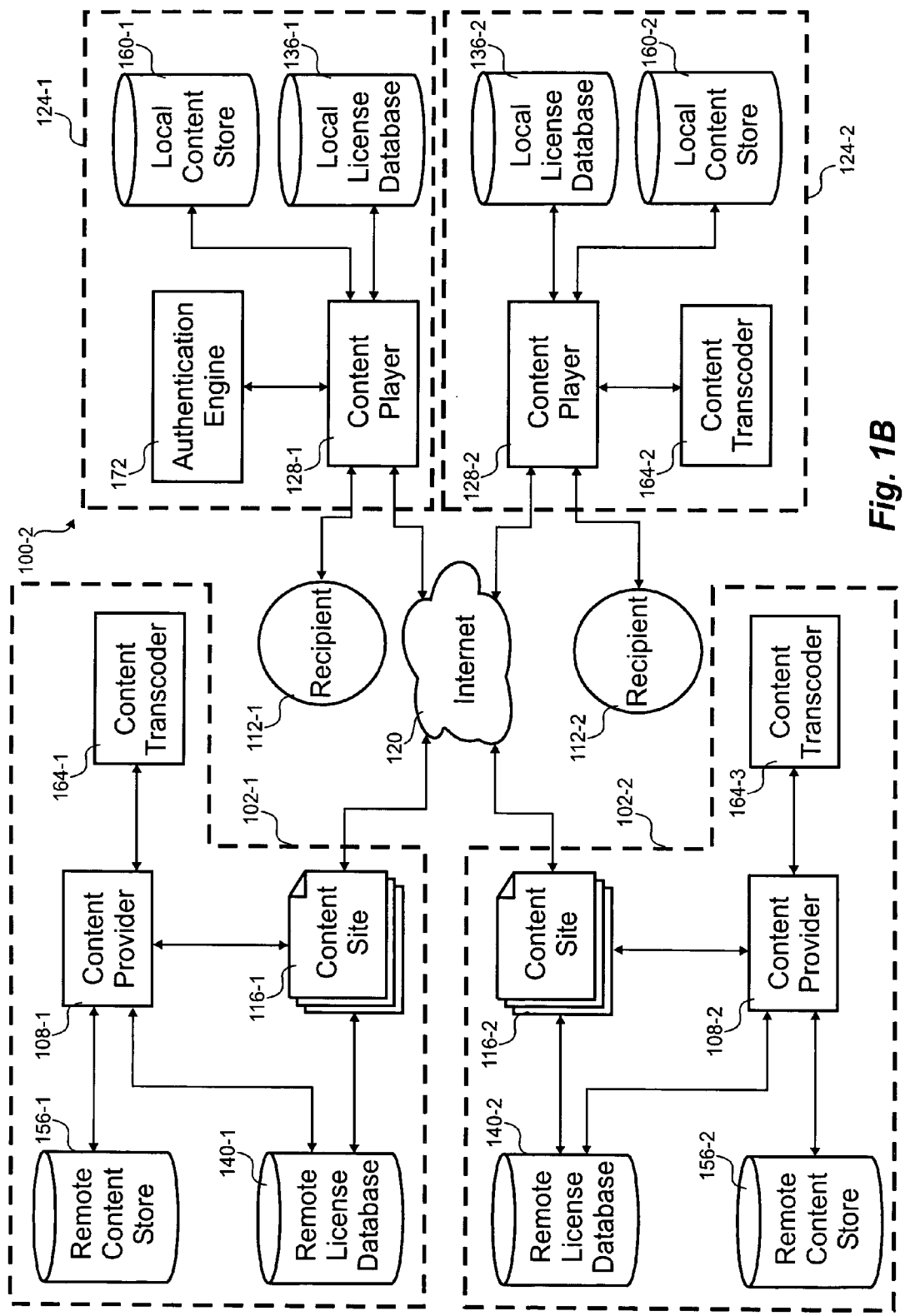

With reference to FIG. 1B, this embodiment of the content distribution system 100-2 does not use a global license database 152. To enable the content objects on the new computing device 124, the copyright licenses are opaquely sent back to the content originator's 102 remote license database(s) 140. Alternatively, the licenses could be looked-up at the content originators 102 without actually sending the content licenses back. In some cases, the user 112 could have downloaded content objects from a number of content providers 108 such that a number of corresponding remote license databases 140 would be used in migrating to the new computing device 124.

The copyright licenses can be opaquely downloaded to the new computing device 124 from the remote license database (s) 140 after proper authentication of the user 112. Additionally, the content objects could reformatted for the new content player using a content transcoder 164. Instead of transcoding, the content originator 102 may have the content objects previously encoded to the new format that are ready for loading on the new computing device 124. The new computing device 124-2 also has a content transcoder 164-2 available for transcoding the content files for the new format.

This embodiment includes an authentication engine 172 at the old computing device 124. The authentication engine 172 could be integral to the content player 128 or operating system. Once the user 112 authenticates their identity, the license transfer is authorized. The content objects could be transferred over the Internet 120 or some other connection. In this embodiment, the old computing device 124-1 is a personal computer and the new computing device 124-2 is a handheld phone. The user 112 may connect the handheld phone to the personal computer with Bluetooth™ or a USB cable to transfer content objects and content licenses.

Figure 1C:
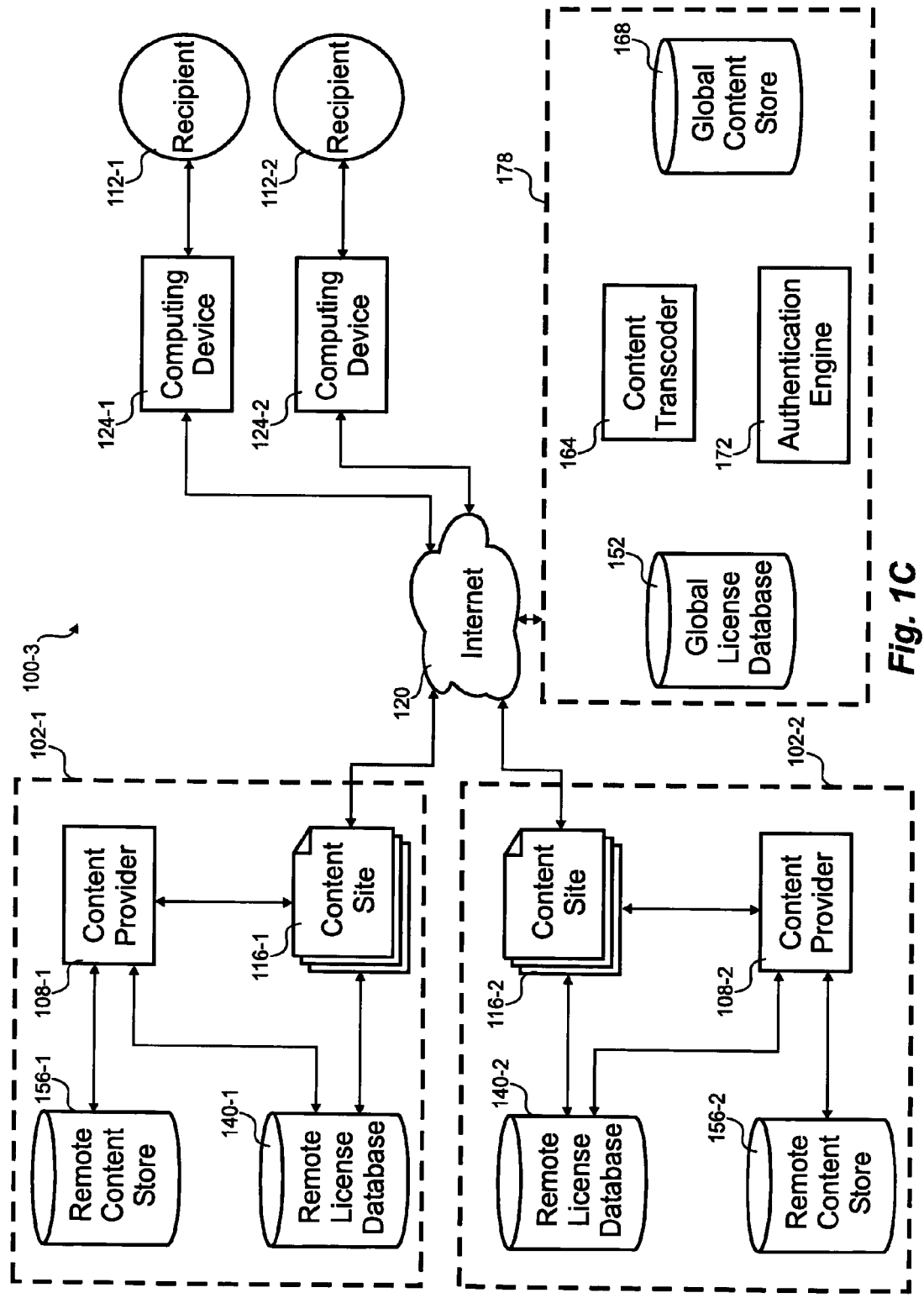

Referring next to FIG. 1C, a block diagram of another embodiment of a content distribution system 100-3 is shown. This embodiment includes a migration system 178 that has a global license database 152, a content transcoder 164, an authentication engine 172, and a global content store 168. The global license database 152 can be used to hold the content licenses when transferring them. Similarly, the content objects can be stored in the global content store 168 before loading onto the new computing device 124-2. Any reformatting of the content objects is performed on the content transcoder 164. Authentication of the user and the content licenses can be performed by the authentication engine 172.

Figure 1D:
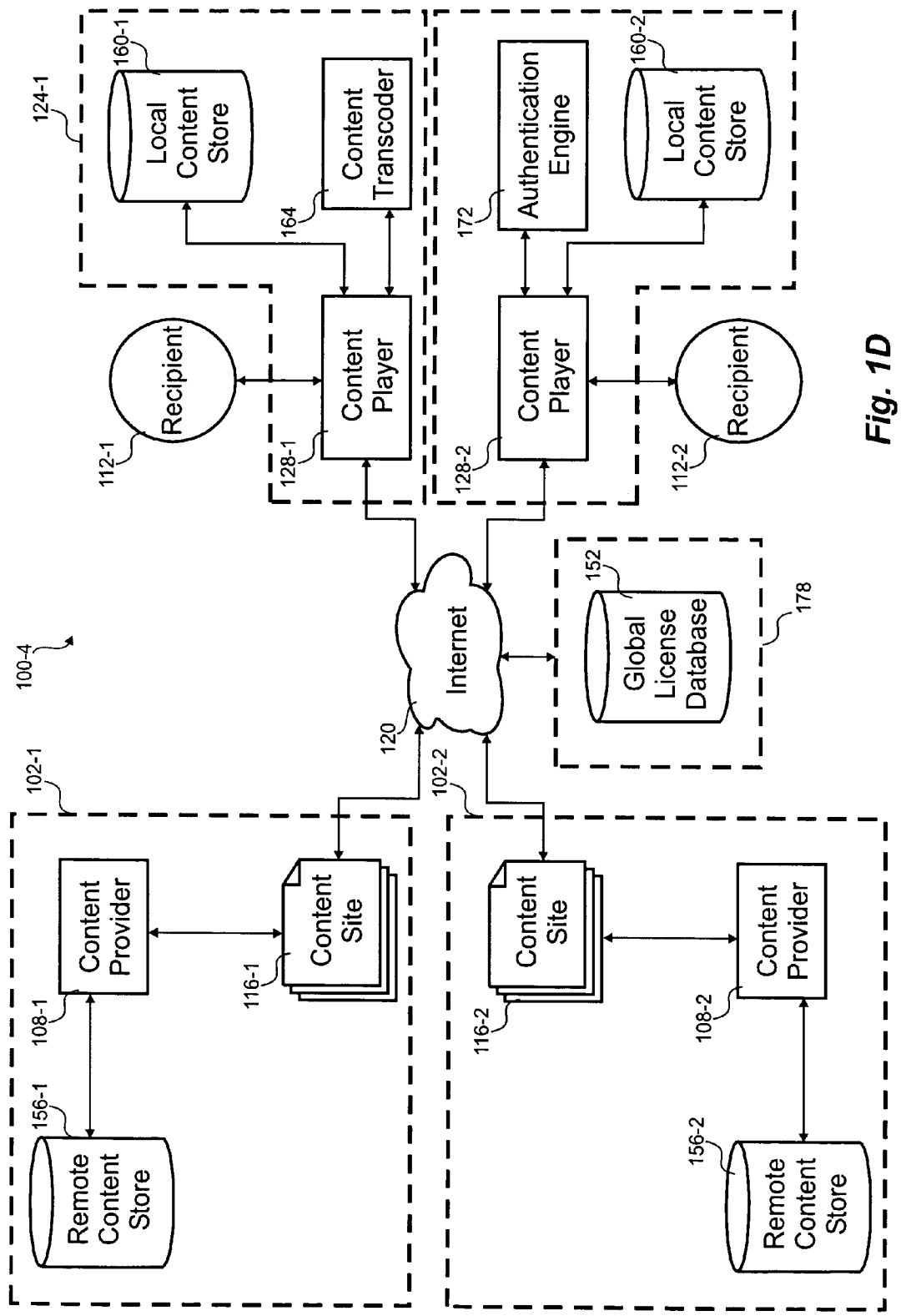

With reference to FIG. 1D, a block diagram of yet another embodiment of a content distribution system 100-4 is shown. In this embodiment, the content licenses can be stored in the global license database 152 in a manner that is accessible to any computing device 124. If the user 112 authenticates their identity to the satisfaction of the computing device 124 and/or global license database 152, the content player 128 will allow playback of a content object on the computing device 124. The content licenses are not stored local to the computing device 124. The content licenses are verified as needed before playing the content object.

Another embodiment allows storage of licenses in the global license database 152 in a way that allows individual licenses or a group of licenses to be checked out to a computing device 124. After authentication of the user 112, the content licenses corresponding to the content requested for playback are checked out to allow use. The user 112 can manually check-in the licenses or the licenses could automatically be checked-in after a period of time unless checked out again.

In this embodiment, the content originators 102 do not track which licenses are issued to users 112. The content originators 102 rely upon the global license database 152. When content objects are licensed, the content licenses could be written to the global license database where they are accessible to the content providers 102 and computing devices 124 on demand.

Figure 1E:
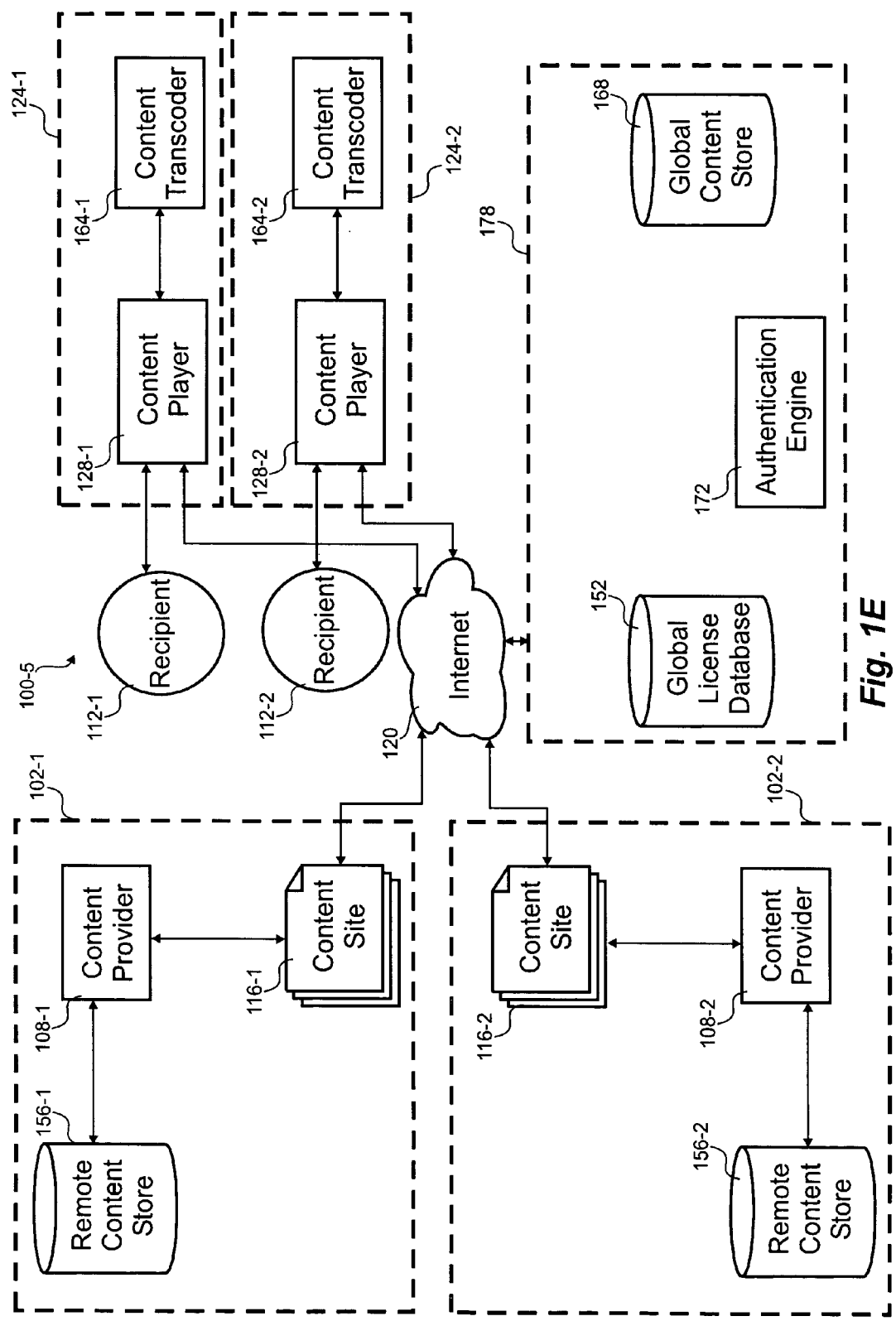

Referring next to FIG. 1E, a block diagram of still another embodiment of a content distribution system 100-5 is shown. In this embodiment, the content objects are not stored at the computing devices 124. Content objects are stored in a global content store 168. Upon proper authentication 172, a recipient 112 can realize content objects on any computing device 124 with any type of content player. The DRM is still provided by the computing device, but the licenses and content objects are stored at the migration system 178 and/or the content providers 102.

The content player 128 can check out a content object and license as needed from either the migration system 178 or the content originator 102. The licenses and content objects can be checked back in or just set to expire after a period of time. The recipient 112 may be charged for the ability to have transportability of content objects between a number of computing devices. The number of computing devices that can be used may be limited. Some embodiments may prevent simultaneous use of the same content object or may prevent use of the migration system by more than one computing device at one time.

The number of times a content object is played could be tracked and reported to gage popularity. Some embodiments could insert commercials into the sequence of content objects. Impressions for those commercials could also be reported.

Figure 1F:
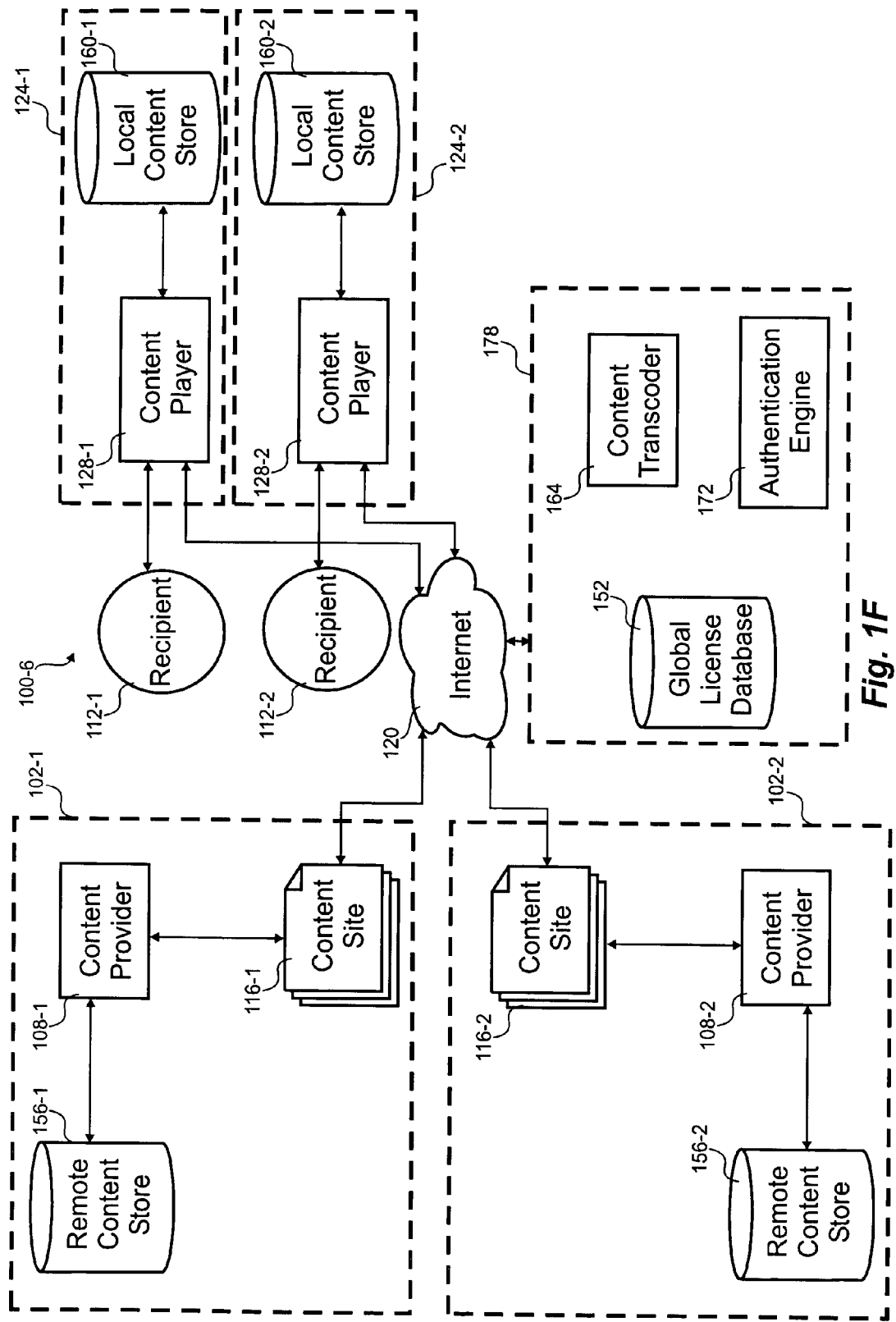

With reference to FIG. 1F, a block diagram of one embodiment of a content distribution system 100-6 is shown. In this embodiment, the migration system 178 is used during the transition to the new computing device 124. The content transcoding, storing of content licenses and authentication is performed by the migration system 178. The user 112 may pay for this service. In one embodiment, the seller or manufacturer of the new computing device 124 subsidizes or pays for this cost.

Figure 1G:
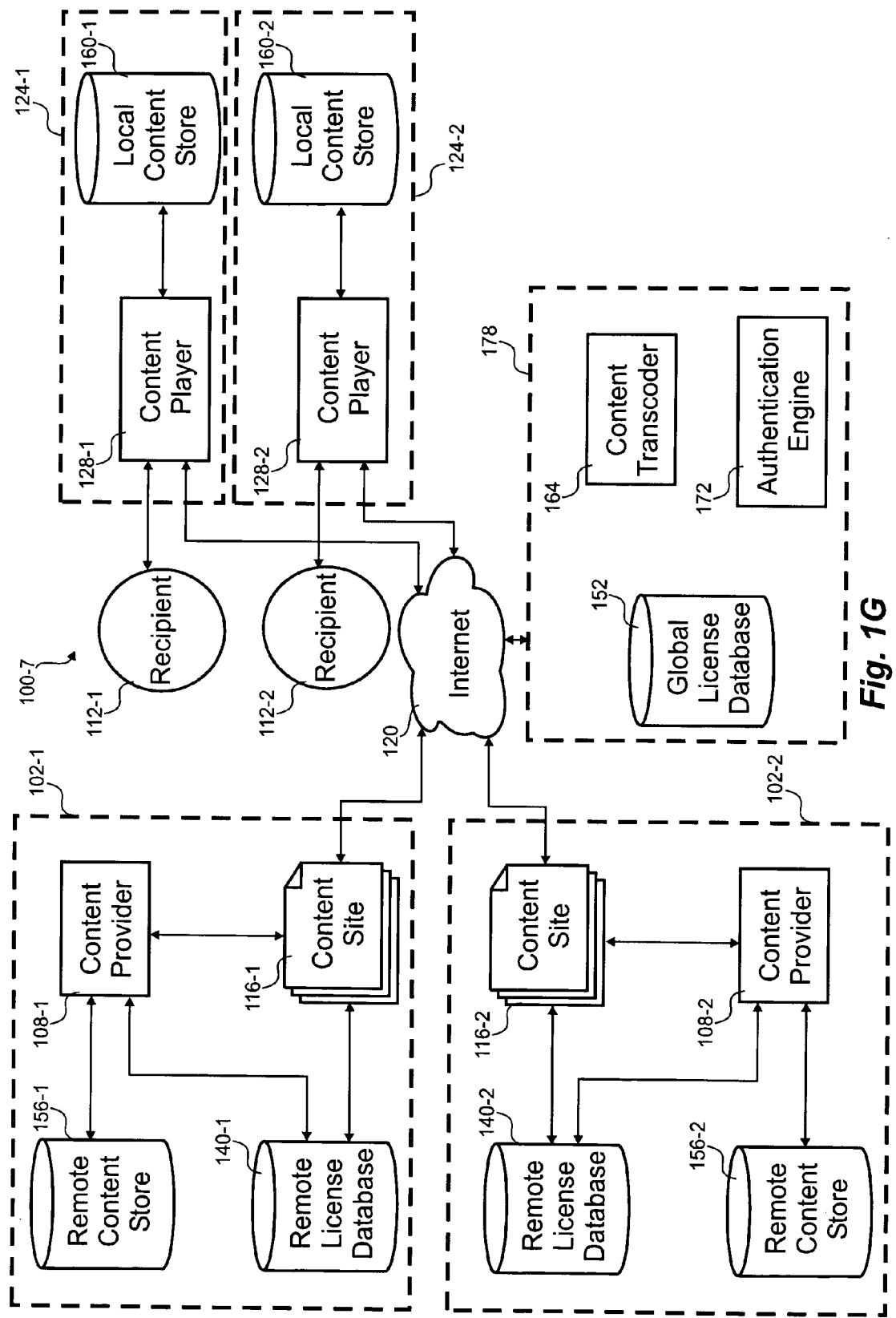

Referring next to FIG. 1G, a block diagram of another embodiment of a content distribution system 100-7 is shown. In this embodiment, the content originator 102 can be used to authenticate the content licenses or be used to migrate the content objects to the new computing device 124 without using the migration system 178. For example, the content originator 102 could be used where available, but the migration system 178 where the content originator 102 cannot be found or has no history of the license. This might occur for content object delivered in tangible form (e.g., on a disk or tape) where there was no electronic delivery.

Figure 2A:
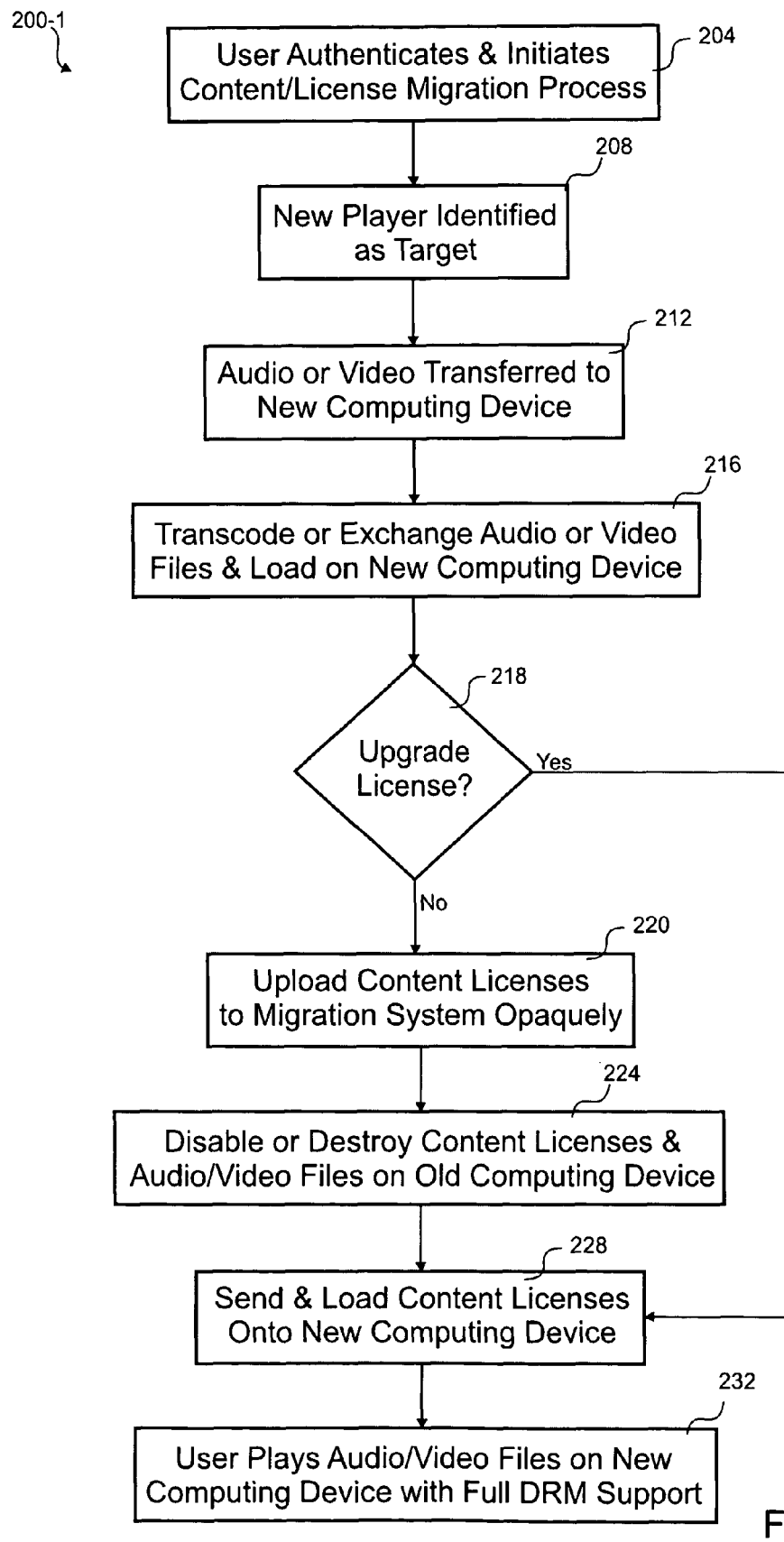
FIGS. 2A, 2B and 2C illustrate flowcharts of embodiments of a process for migrating licensed content to a new content player.

With reference to FIG. 2A, a flowchart of an embodiment of a process 200-1 for migrating licensed content to a new content player 124-2 is shown. The process 200-1 can be largely automatic after the user initiates the process in block 204. The user manually authenticates herself also in block 204. Authentication may include entry of license codes and/or login information. The authentication information may be entered through either the old or new computing devices 124. The new player is manually identified in step 208. The content objects are transferred to the new computing device automatically in block 212. Some embodiments move the content objects directly from one local content store 160 to another, but other embodiments use a remote or global content store 156, 168 as a waypoint between the old and new local content stores 160.

In block 216, any transcoding or exchange of the content objects is performed. Some embodiments transcoder the content objects, while others get another copy of the content object that is already coded properly. Transcoding can be performed at either computing device 124, the migration system 178 or the content originators 102 in various embodiments. Also in block 216, the content objects are loaded on the target computing device 124-2.

This embodiment allows the user to upgrade his or her licenses to the content objects as determined in block 218. Upgrading licenses could involve a number of content originators 102 and could be managed by the migration system 178. There could be an option to upgrade to a two computing device 124 license allowing the content objects to simultaneously exist on the two computing devices 124. Another option could allow more computing devices 124 or even an unlimited number of computing devices 124. Where there is an upgraded license, processing skips over blocks 220 and 224 to step 228.

Where there is no upgrade of licenses, processing goes from block 218 to block 220 where the content licenses are uploaded to the migration system 178 opaquely to avoid interception or decoding. Encryption can be used in this process. The migration system 178 may or may not be able to decode the content licenses before they are passed along. Somewhere, the content licenses are reformatted for the new content player 128-2 and DRM. In block 224, the content licenses and content objects on the old computing device 124-1 are disabled or destroyed.

In block 228, the content licenses are sent and loaded onto the new computing device. The transport can once again be opaque to avoid interception. At this point in the process 200-1, the content files and licenses are recoded and on the new computing device 124-2 such that they are available for use with full DRM support of the new content player 128-2. This process may be repeated for new content players as the need arises such that a user can avoid wholesale repurchase of licenses in this embodiment.

Figure 2B:
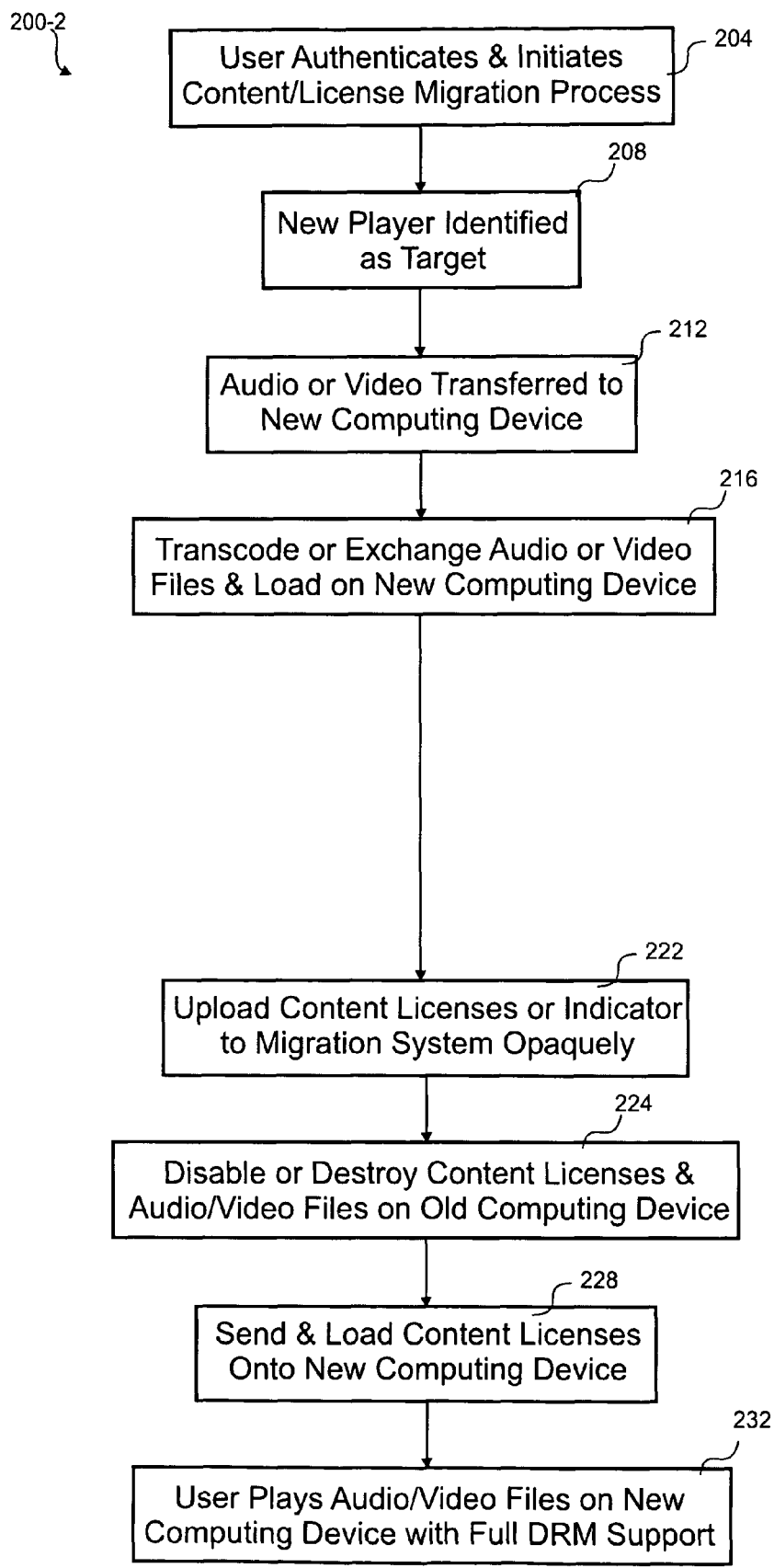

Referring next to FIG. 2B, a flowchart of another embodiment of a process 200-2 for migrating licensed content to a new content player 124-2 is shown. This embodiment replaces blocks 218 and 220 with new block 222. After the content objects are loaded, the content licenses or an indicator thereof is send to the migration system 178. An indicator could simply be an account identifier for a content originator 102. The migration system 178 could go to the content originator 102 to get all the content licenses associated with the account that is identified. This embodiment does not allow upgrading the content license and performs block 224 in every case before completing blocks 228 and 232 as in the embodiment of FIG. 2A.

Figure 2C:
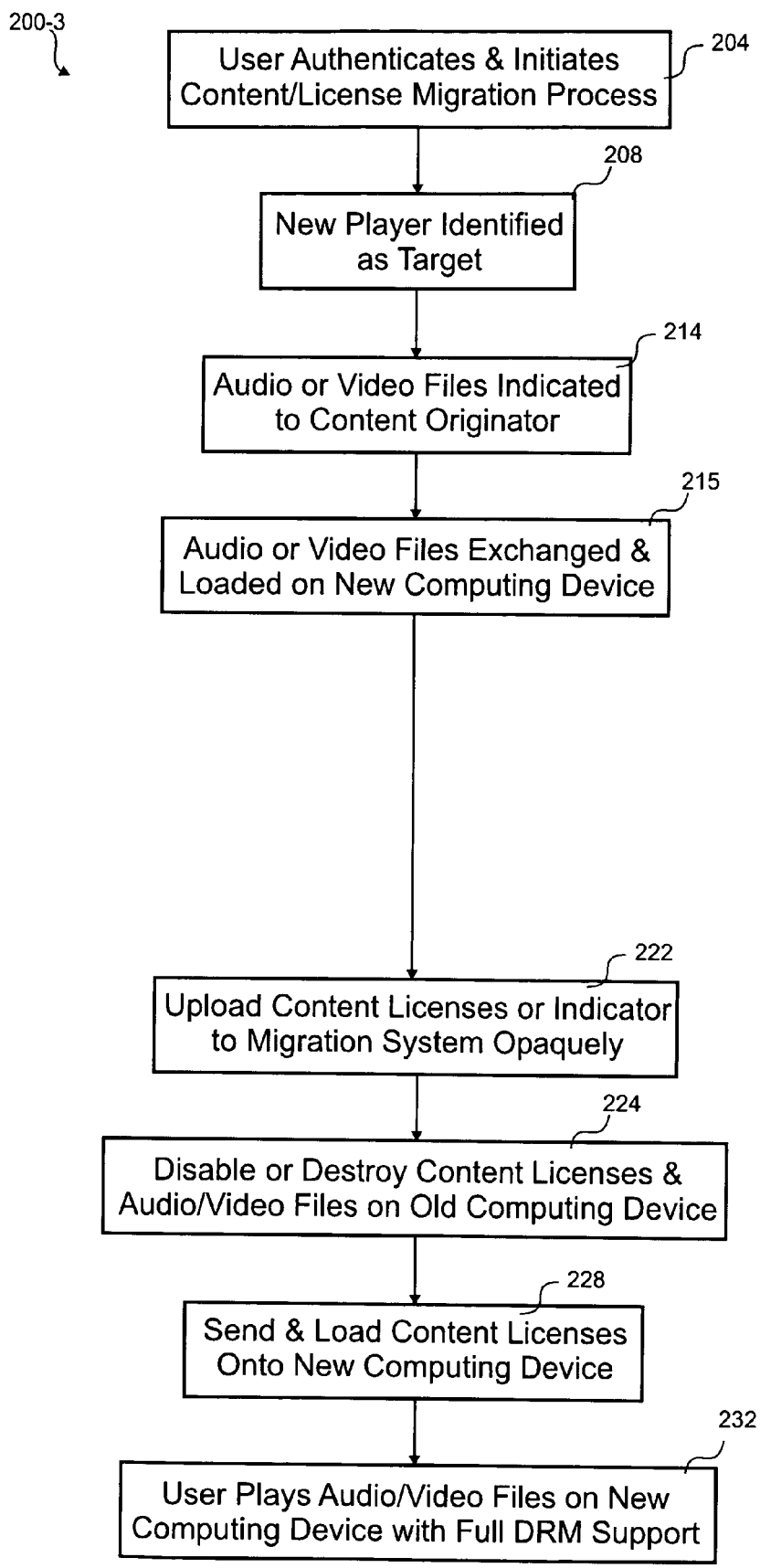

With reference to FIG. 2C, a flowchart of yet another embodiment of a process 200-3 for migrating licensed content to a new content player 124-2 is shown. This embodiment differs from that of FIG. 2B in that blocks 212 and 216 are replaced by blocks 214 and 215. In block 214, the content objects are identified to the migration system 178. New versions of these content objects are obtained in block 215 and loaded onto the new computing device 124 rather than performing any transcoding.

A number of variations and modifications of the disclosed embodiments can also be used. For example, the above embodiments discuss using the license exchange for audio and video, but other embodiments are not to be limited in that way. Any content object that has DRM could be exchanged to a new program that has different DRM. For example, software or data could benefit from embodiments.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques described above may be done in various ways. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

While the principles of the disclosure have been described above in connection with specific apparatuses and methods, it is to be clearly understood that this description is made only by way of example and not as limitation on the scope of the disclosure.

What is claimed is:

1. A content distribution system for transporting audio or video licenses between content players that use digital rights management (DRM), the content distribution system comprising:
   a first content player having a first content repository and a first license repository;
   a second content player having a second content repository and a second license repository, wherein:
      the second content player is geographically separate from the first content player,
      the first content player is associated with a first DRM function,
      the second content player is associated with a second DRM function,
      the second license repository receives second information describing a second plurality of content licenses,
      the first license repository stores a first plurality of content licenses,
      the first plurality of content licenses are maintained by the first DRM function,
      the second DRM function does not accept the first plurality of content licenses associated with the first DRM function,
      the first plurality of content licenses enable use of a plurality of content objects with the first content player within confines of the first DRM function,
      the first content repository stores the plurality of content objects, and
      the plurality of content objects are separate files from the first and second plurality of content licenses; and
   a migration server that includes at least an authentication engine and a license repository, wherein:
      the migration server is geographically distant from the first and second content players,
      the migration server translates the first plurality of the content licenses into the second plurality of content licenses,
      the authentication engine authorizes the second plurality of content licenses of the second license repository, and
      the second plurality of content licenses enable use of the plurality of content objects with the second content player within the confines of the second DRM function.

2. The content distribution system for transporting audio or video licenses between content players that use DRM as recited in claim 1, wherein:
   the first plurality of content licenses comply with a first DRM function,
   the second plurality of content licenses comply with a second DRM function, and the first DRM function is different from the second DRM function.

3. The content distribution system for transporting audio or video licenses between content players that use DRM as recited in claim 1, wherein the content originator provides the second plurality of content licenses to the second license repository.

4. The content distribution system for transporting audio or video licenses between content players that use DRM as recited in claim 1, wherein the second plurality of content licenses:
   identifies the plurality of content objects, and
   specifies a scope of the license for the plurality of content objects.

5. The content distribution system for transporting audio or video licenses between content players that use DRM as recited in claim 1, wherein the migration server provides the second plurality of content licenses to the second license repository.

6. The content distribution system for transporting audio or video licenses between content players that use DRM as recited in claim 1, wherein:
   the plurality of content objects are encoded in a first codec for the first plurality of content licenses,
   the plurality of content objects are encoded in a second codec for the second plurality of content licenses, and
   the first codec is different from the second codec.

7. The content distribution system for transporting audio or video licenses between content players that use DRM as recited in claim 1, further comprising a content transcoder for converting format of the plurality of content objects to make the plurality of content objects compatible with the second content player.

8. The content distribution system for transporting audio or video licenses between content players that use DRM as recited in claim 1, wherein the second license repository is geographically distant from the second content player.

9. The content distribution system for transporting audio or video licenses between content players that use DRM as recited in claim 1, wherein the second license repository is collocated with the second content player.

10. A method for transporting content licenses from a first content player to a second content player, the method comprising:
   reading a plurality of content licenses from a first repository of the first content player, wherein:
      the first content player is associated with a first DRM function,
      the plurality of content licenses are maintained by the first DRM function,
      the plurality of content licenses enable use of a plurality of content objects within confines of the first DRM function on the first content player,
      the plurality of content objects are separate files from the plurality of content licenses, and
      the plurality of content licenses are associated with a plurality of licensors;
   translating the plurality of content licenses to be compatible with a second DRM function on the second content player, wherein the second DRM function does not accept the plurality of content licenses associated with the first DRM function,
   sending the plurality of content licenses to a store, wherein:
      the store is geographically remote to the first repository, and
      the store retains the plurality of content licenses;
   sending authentication information of a licensee of the plurality content licenses; and
   writing the plurality of content licenses to a second repository of the second content player, wherein the second content player can use the plurality of content objects within the confines of the second DRM function.

11. The method for transporting content licenses from the first content player to the second content player as recited in claim 10, further comprising encrypting the plurality of content licenses before sending the plurality of content licenses to the store.

12. The method for transporting content licenses from the first content player to the second content player as recited in claim 10, further comprising transcoding the plurality of content objects to a format compatible with the second content player.

13. The method for transporting content licenses from the first content player to the second content player as recited in claim 10, further comprising authenticating an identity of a user of the second content player.

14. The method for transporting content licenses from the first content player to the second content player as recited in claim 10, wherein:
   the plurality of content licenses comply with a first DRM function for the first content player,
   the plurality of content licenses comply with a second DRM function for the second content player, and
   the first DRM function is different from the second DRM function.

15. The method for transporting content licenses from the first content player to the second content player as recited in claim 10, wherein the plurality of content licenses:
   identifies the plurality of content objects, and
   specifies a scope of a license for the plurality of content objects.

16. A machine-readable medium having machine-executable instructions for performing the machine-implementable method for transporting content licenses from the first content player to the second content player as recited of claim 10.

17. A machine adapted to perform the machine-implementable method for transporting content licenses from the first content player to the second content player as recited of claim 10.

18. A method for transporting audio or video licenses between content players, the method comprising:
   receiving first information, from a first content player, describing a first plurality of content licenses at a point, wherein:
      the first content player is associated with a first DRM function,
      the first content player comprises at least a first license repository and a first content repository,
      the first license repository stores the first plurality of content licenses,
      the first plurality of content licenses enable use of a plurality of content objects on the first content player as allowed by the first DRM function,
      the first content repository stores the plurality of content objects, and
      the plurality of content objects are separate files from the first plurality of content licenses;
   authenticating a licensee of the first plurality of content licenses,
   translating the first plurality of content licenses into a second plurality of content licenses; and sending second information enabling the second plurality of content licenses corresponding to the first plurality of content licenses away from the point, wherein:
  the second plurality of content licenses is stored with a second repository of a second content player,
  the point is geographically remote to the first and second content players, and
  the second plurality of content licenses allows use of the plurality of content objects on the second content player as allowed by a second DRM function, wherein the second DRM function does not accept the first plurality of content licenses associate with the first DRM function.

19. The method for transporting audio or video licenses between content players as recited in claim 18, further comprising transcoding the plurality of content objects to a format compatible with the second content player.

20. The method for transporting audio or video licenses between content players as recited in claim 18, wherein the authenticating comprises authenticating the first plurality of content licenses with a content originator who originally granted the first plurality of content licenses.

21. The method for transporting audio or video licenses between content players as recited in claim 18, wherein the authenticating comprises authenticating an identity of a user of the second content player.

22. The method for transporting audio or video licenses between content players as recited in claim 18, wherein:
  the first plurality of content licenses comply with a first DRM function,
  the second plurality of content licenses comply with a second DRM function, and
  the first DRM function is different from the second DRM function.

23. The method for transporting audio or video licenses between content players as recited in claim 18, wherein the second plurality of content licenses:
  identifies the plurality of content objects, and
  specifies a scope of a license for the plurality of content objects.

24. A machine-readable medium having machine-executable instructions for performing the machine-implementable method for transporting audio or video licenses between content players of claim 18.

25. A machine adapted to perform the machine-implementable method for transporting audio or video licenses between content players of claim 18.

26. The method for transporting content licenses from the first content player to the second content player as recited in claim 10, further comprising upgrading the plurality of content licenses for allowing the plurality of content licenses to simultaneously exist on the first and second content players.

27. The method for transporting audio or video licenses between content players as recited in claim 18, further comprising upgrading the first plurality of content licenses for allowing the first and second plurality of content licenses to simultaneously exist on the first and second content players.

* * * * *